Patented Aug. 12, 1952

2,606,936

UNITED STATES PATENT OFFICE 2,606,936

PURIFICATION OF PHENOLIC ACIDS

Vesta F. Michael, Wichita, Kans., assignor to Wood River Oil & Refining Co., Inc., Wichita, Kans., a corporation of Kansas No Drawing. Application November 29, 1950, Serial No. 198,245

9 Claims. (Cl. 260—627)

The present invention relates to a process for the purification of phenolic acids, particularly the cresylic acids contained in the nonaqueous materials liberatable from the spent caustic soda liquors derived from the treatment of hydrocarbon oils, etc.

More particularly, the invention relates to the purification of phenolic acids, for example cresylic acids, containing thiophenols, mercaptans, and other sulfur compounds.

It is therefore one of the objects of the present invention to remove thiophenols, mercaptans and other sulfur compounds from phenolic substances such as phenol, cresylic acids, and the like.

It is a further object selectively to esterify the phenolic content of impure phenolic substances containing thiophenols, mercaptans, sulfur compounds, and hydrocarbons so as only to esterify the relatively pure phenolic substances therein contained, while leaving the thiophenols and other compounds substantially unreacted.

Further objects of the present invention will become apparent from the further description hereinbelow.

In the hydrocarbon treating art it has long been the practice to wash various hydrocarbon oils and distillates with solutions of caustic soda, that is to say, sodium hydroxide, for the purpose of removing therefrom substances which are reactive with or are neutralizable by sodium hydroxide. Thus, for example, motor fuel and other hydrocarbon liquids have been contacted with aqueous solutions of sodium hydroxide, usually referred to in the art as caustic soda solutions, whereby the hydrocarbon liquids have been relieved of their content of alkali-soluble constituents such as phenols, cresylic acids, thiophenols and various mercaptans and hydrocarbons. Some of these materials, such as the mercaptans and the other sulfur compounds and hydrocarbons, while not directly soluble in aqueous solutions of sodium hydroxide, are nevertheless solutized by the formed sodium phenolates and sodium cresylates which are the result of the reaction between the sodium hydroxide with the phenolic contents of the hydrocarbon liquids.

It has also become common practice to recover the thus dissolved and solutized materials from the spent caustic soda liquors, either from the dilute liquors or from liquors which have first been concentrated, by the expedient of neutralizing them with a suitable acidic material, whereby the phenolic substances, thiophenols, mercaptans and solutized hydrocarbons will be liberated and form a supernatant oily layer on the neutralized or partly neutralized caustic soda liquor. These layers have usually been removed, washed with water to remove any salts contained therein, or excess caustic if any remain, or excess acid, if such had been used, whereafter these oily liquids were distilled in an attempt to purify them. However, by virtue of the fact that thiophenols, mercaptans and certain hydrocarbons have boiling points not very far removed from the boiling points of the phenolic substances, the usual result has been a liquid distillate which still contained the undesired thiophenols, mercaptans, and other sulfur compounds. The presence of such sulfur compounds was deemed to be highly undesirable from the point of view of the commercial utilization of these liberated phenolic compounds, particularly if they were to be employed for the manufacture of disinfectants, or to be used as a component in synthetic resins, for example such as are obtainable by reacting these phenolic substances with aldehydes such as formaldehyde.

The surprising discovery has now been made by the present applicant that it is possible selectively to esterify the pure phenolic substances, such as the phenols and the various cresylic acids, contained in such "oil acids," by means of boric acids, to form a boric acid ester of these materials. Boric acid, having three replaceable hydrogen atoms, is therefore potentially capable of forming triphenyl borate or its equivalent other triphenylic compound. In order to avoid further circumlocution, it is to be understood in connection with the further description hereinbelow that the terms "phenol" and "phenyl" are used in their generic sense and are intended to include the various homologues thereof, such as the cresols (ortho, meta, and para) sometimes also known as cresylic acids.

The process of the present invention may be applied, for example, to the purification of the oily stratum recovered from the acidification of spent caustic soda liquors. This may be done by treating the oily material with a slight stoichiometric excess of boric acids under conditions in which any water present or formed during the reaction will be substantially eliminated.

This may be accomplished, for example, by a process involving azeotropic distillation, with a light hydrocarbon having from 6 to 7 carbon atoms, such as one of the heptanes, preferably normal heptane, or an aromatic hydrocarbon such as benzene. For example, the process may be carried out by treating the spent caustic soda liquor derived from the treatment of organic liquids, for example hydrocarbons, by blowing carbon dioxide into it, which may be derived from some part of the process being carried out in an oil refinery. Very advantageously it may be the "off-gas" from the regeneration of the catalyst of a fluid catalytic cracking unit. As is known in this art, such catalysts become contaminated by a deposit of carbon thereon which has to be periodically burned off by passing an oxygen-containing gas through the catalyst under conditions in which the carbon is burnt off, therefore forming a gas containing large amounts of carbon dioxide. Such a gas may be used to neutralize the caustic soda liquors, thus forming sodium carbonate and sodium bicarbonate with concomitant liberation of the so-called "oil acid phase" which will float upon the aqueous layer of sodium carbonate and bicarbonate. This oily layer contains the oil-acids which include the phenolic compounds, the thiophenols, mercaptans, and other materials. This so-called oil-acid layer is first washed with water in order to remove water-soluble constituents as far as possible, whereafter the thus partially purified oil-acids are conducted to that part of the plant where the main process of the present invention is to be carried out. This is accomplished, as already indicated, by adding to the oil-acids a slight stoichiometric excess of boric acid in an amount sufficient potentially to form the triborate of the phenolic materials present.

The mixture is then refluxed with heptane, benzene or the like, to remove the water and water of reaction in the form of a constant boiling mixture or azeotrope. When water is no longer given off, which requires about five hours, the reaction is essentially complete. Moreover, the hydrocarbon which has been used for driving off the water by azeotropic distillation is then distilled off and the temperature is raised until the thiophenols and other organic materials are distilled from the high boiling borate esters, this being accomplished either at atmospheric pressure or preferably at subatmospheric pressure. Inasmuch as these borate esters have a boiling point of about 300° F. higher than that of the thiophenols, mercaptans, and other unreacted sulfur compounds and contaminating hydrocarbons, separation by distillation thus becomes easy.

After these impurities have been boiled off and the substantially pure borate esters have been left behind, these are hydrolyzed with just enough water to decompose them, this being done at about 210° F. for the purpose of maintaining all of the liberated boric acid in solution. At this temperature 100 parts of water are capable of carrying 40 parts of boric acid in solution. The addition of the water produces substantially instantaneous hydrolysis of the borate ester with the result that the phenolic acids, for instance cresylic acids, separate out as a separate supernatant oily phase.

These acids are at this stage still slightly discolored, but upon distillation at atmospheric pressure will yield a substantially colorless solution of cresylic acids, which is "doctor sweet" and contains no sulfur or sulfur compounds.

A more definite exemplification of one manner of carrying out the present invention on a laboratory scale is as follows, being an example of the purification of cresylic acids:

Thus for example, 500 milliliters of anhydrous oil-acids (having a sulfur content of about 5.47% by weight), as recovered from the spent caustic solution used for treating fluid-catalytic cracked gasoline, were added to 80 grams of boric acid plus 200 milliliters of normal heptane. This mixture was refluxed at a pot temperature of about 250° to about 290° F. and an overhead temperature of about 155° F. which is the boiling point of the heptane water azeotrope. The water of reaction was thus withdrawn in the form of the heptane water azeotrope which was allowed to pass out of the vessel and condense, whereupon it separated into two layers, a lower water layer and an upper one of heptane. The heptane layer was constantly redirected into the vessel so that the boiling would continue. This refluxing or azeotropic distillation was continued for about five hours until it was found that substantially no further amounts of water were separating from the heptane condensate, therefore indicating that the desired esterification had completed itself. Thereafter the heptane and the unreacted components of the mixture were distilled from the contents of the vessel, leaving the phenolic boric acid ester therein. This was done at atmospheric pressure. There were obtained approximately 187 milliliters of thiophenols, mercaptans, and hydrocarbons, all having boiling points above that of heptane, and these materials had a sulfur content of approximately 13.47% by weight. During this fractionation the heptane was separately recovered. The over-all vapor leaving the still or vessel reached a maximum temperature of about 400° F. whereas the pot temperature (the boiling borate esters) increased to a temperature greater than 760° F., but even at this temperature there was no decomposition of the esters, nor were any phenols distilled over.

There were thus obtained about 290 milliliters of the borate esters of the phenolic materials. In order to hydrolyze them there were added 740 milliliters of water and the resulting mixture was heated to about 210° F., whereupon two phases were formed—an upper layer of the desired purified phenolic substances, and a lower aqueous layer of boric acid. These phases were separated, yielding 275 milliliters of the purified phenols, which were then distilled at atmospheric pressure. The resulting phenolic substances were colorless and were found to be substantially free from sulfur and sulfur compounds.

As a general guide to the amount of water required, it might be stated that one volume of the phenolic borate esters requires admixture with about two and one-half volumes of water at about 210° F. The hydrolysis is substantially instantaneous, and will take place even at a lower temperature, in which case however a much larger volume of water would be required because water at 32° F. will only dissolve 2.66 parts of boric acid in 100 parts of water, while at 210° F. water will carry up to about 40% by weight of boric acid in solution.

It might be pointed out that no explanation is offered for the fact that the thiophenols do not also form a boric acid ester under these conditions, but the empirical fact remains that they do not. It is this discovery which is the fundamental basis for the application of such discovery to the useful and workable process which forms the subject matter of the present invention.

It will be self-evident that the process is equally applicable to the purification of phenol itself when contaminated with thiophenol or other sulfur compounds as well as to the purification of mixtures of cresylic acids similarly contaminated, and that the invention is therefore not limited exclusively to the treatment of the oil-acids derived from the acidification of the caustic liquors used for treating hydrocarbons such as, for example, cracked gasoline. The invention is therefore of wide applicability and utility.

The instrumentalities employed for carrying out the present invention are all well known to chemists and chemical engineers, and therefore it has not been deemed necessary to describe any particular apparatus.

I claim:

1. Process of purifying phenolic oil-acids containing phenols, thiophenols and sulfur compounds which comprises treating said oil-acids with boric acid to produce the borate esters of the phenols therein, distilling off unesterified constituents, subsequently hydrolyzing the borate esters to liberate purified phenols, and recovering the latter.

2. Process of purifying a mixture containing phenols contaminated with thiophenols, mercaptans and other sulfur compounds and hydrocarbons which comprises esterifying the phenol content of said mixture with boric acid to produce the borate ester of said phenol, distilling off substantially unchanged thiophenols, mercaptans and hydrocarbons, hydrolyzing the residual borate esters of phenol to liberate the phenol, and recovering the latter.

3. Process of eliminating thiophenols, sulfur compounds and hydrocarbons from crude phenolic oil-acids which comprises esterifying the phenolic content of said crude phenolic oil-acids with boric acid to produce a high-boiling phenolic boric acid ester, distilling thiophenols, sulfur compounds and hydrocarbons therefrom, hydrolyzing said phenolic boric acid ester to liberate free boric acid and free phenol, and recovering the latter.

4. Process of producing relatively pure phenols from spent caustic soda liquors derived from the purification of hydrocarbons which comprises the steps of liberating a non-aqueous mixture of phenols, thiophenols, mercaptans, and hydrocarbons from said liquor by neutralization thereof, separating the supernatant non-aqueous layer thus formed and treating it with a slight stoichiometric excess of boric acid relative to its phenol content to produce a high-boiling phenol boric ester, distilling off the thiophenols, mercaptans and hydrocarbons from said ester, hydrolyzing the ester to liberate the phenol therefrom, and recovering the latter.

5. Process of purifying phenolic oil-acids containing impurities such as thiophenols, mercaptans and other sulfur compounds which comprises mixing said impure phenolic oil-acids with a slight stoichiometric excess of boric acid (to potentially form triphenyl borate) and refluxing the resulting mixture with a low-boiling hydrocarbon capable of forming an azeotrope with water, thereby removing water from the mixture and producing a borate of phenol; distilling off excess hydrocarbons, thiophenols and other sulfur compounds from said borate; hydrolyzing the borate by the action thereon of an excess of water thereby forming free phenol and boric acid, and recovering the thus liberated purified phenol.

6. The process as defined in claim 5 in which the phenolic oil-acid is a mixture of cresylic acids derived from the spent caustic soda liquors used in the treatment of hydrocarbons.

7. The process as defined in claim 5 in which the low-boiling hydrocarbon has from 6 to 7 carbon atoms.

8. The process as defined in claim 7 in which the hydrocarbon is a heptane.

9. The process as defined in claim 7 in which the hydrocarbon is benzene.

VESTA F. MICHAEL.

REFERENCES CITED

The following references are of record in the file of this patent:

UNITED STATES PATENTS

| Number | Name | Date |
|---|---|---|
| 2,068,415 | Klipstein | Jan. 19, 1937 |
| 2,209,150 | Byrnes | July 23, 1940 |
| 2,260,336 | Prescott et al. | Oct. 28, 1941 |
| 2,270,491 | Yabroff et al. | Jan. 20, 1942 |
| 2,507,506 | Dreisbach et al. | May 16, 1950 |